INVENTORS.
BENJAMIN H. KRYZER
ROLAND R. REID
BY Byron, Hume, Groen & Clement
Attorneys.

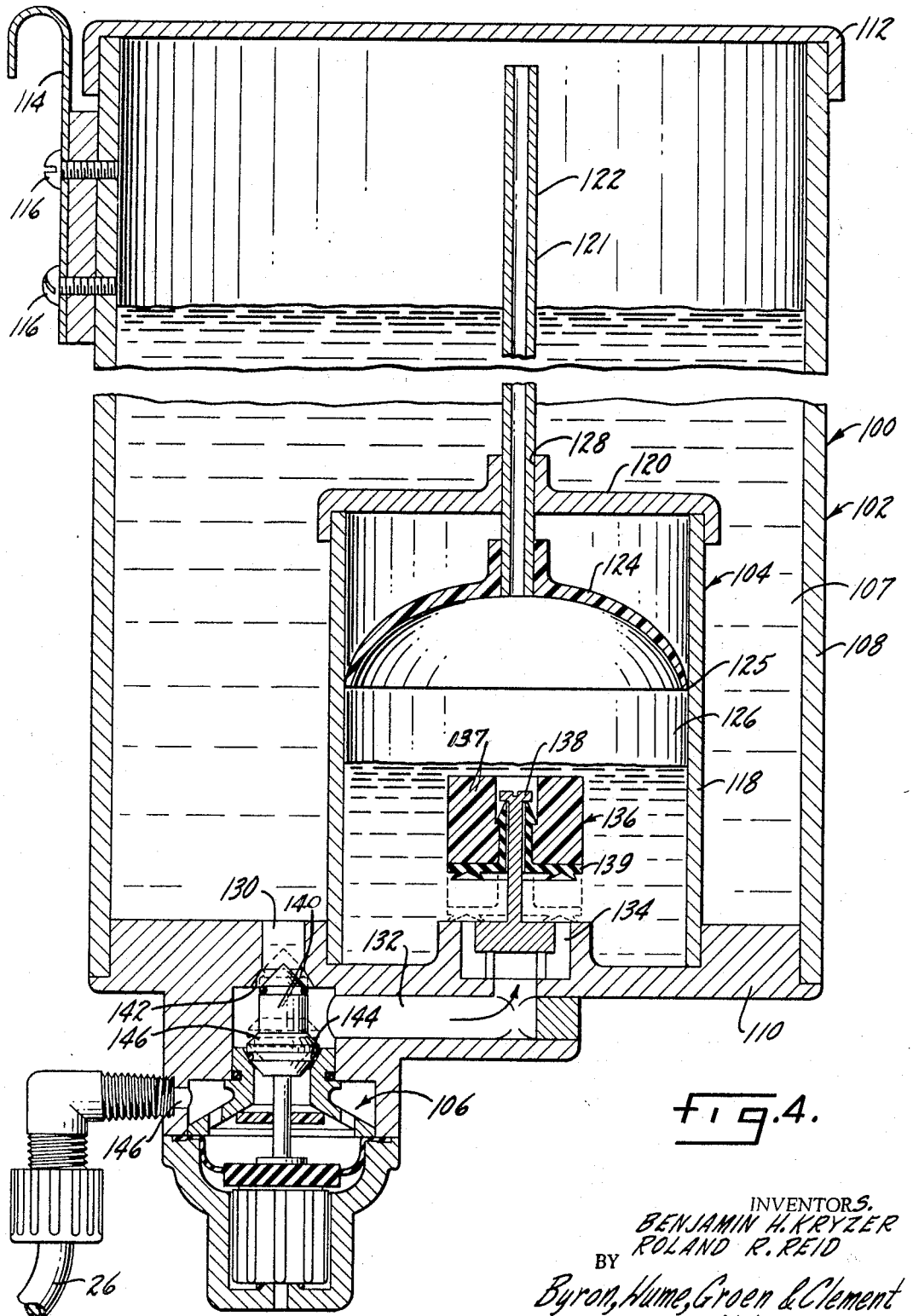

United States Patent Office 3,325,012
Patented June 13, 1967

3,325,012
WATER CONDITIONING SYSTEM
Benjamin H. Kryzer, St. Paul, and Roland R. Reid, White Bear Lake, Minn., assignors to Union Tank Car Company, Chicago, Ill., a corporation of New Jersey
Filed June 5, 1963, Ser. No. 285,814
2 Claims. (Cl. 210—126)

This invention relates to means for dispensing a liquid and, more particularly, to an acid dispenser suitable for use in a water softening system.

Water softening with ion exchange resin particles is well known in the art. After prolonged contact of the ion exchange resin particles with raw water during the service cycle, these resin particles become "exhausted," i.e., their ability to exchange soft ions for the hard ions in the raw water is substantially diminished. When the ion exchange resin particles become exhausted, they must be regenerated. Heretofore, regeneration has been effected by contacting the resin particles with a brine solution, e.g., an aqueous solution of sodium chloride. More recently, it has been found that improved regeneration of the ion exchange resin particles is achieved by contacting the resin particles with an aqueous acid solution, such as citric acid or the like, and the brine solution. A sequential process may be employed wherein the resin particles are contacted first with the acid solution and then the brine solution. Likewise, the resin particles may be simultaneously contacted with the acid solution and the brine solution. These processes are discussed in detail in copending application Ser. No. 170,043, filed Jan. 31, 1962, and now abandoned and assigned to the assignee of the present application. In any event, such processes require means to dispense the aqueous acid solution which is to be contacted with the resin particles during the regeneration cycle.

Accordingly, it is an object of the present invention to provide a means for dispensing a liquid.

It is another object of the present invention to provide a means for dispensing a predetermined, variable amount of liquid.

It is a further object of the present invention to provide a liquid dispenser adapted to dispense a predetermined, variable amount of a liquid to a line, the liquid dispenser being actuated by the pressure in the line.

It is still another object of the present invention to provide a metering device for a liquid dispenser.

These and other objects more apparent hereinafter are realized by the liquid dispenser embodying the features of the present invention. The liquid dispenser is adapted to dispense a predetermined, variable amount of liquid to a line to which it is attached. The pressure in the line actuates the liquid dispenser. A metering device embodying the features of the present invention receives and dispenses the liquid and is adapted to be adjusted to vary the amount of liquid to be dispensed.

The invention, both as to its organization and method of operation, taken with further objects and advantages thereof, will be understood by reference to the following description taken in conjunction with the accompanying drawings, in which:

FIGURE 3 is a fragmentary view of the acid dispenser shown in FIGURE 1 when the metering chamber has been reduced in size; and FIGURE 4 is a cross-sectional view of a modified acid dispenser embodying the features of the present invention.

Figure 1:
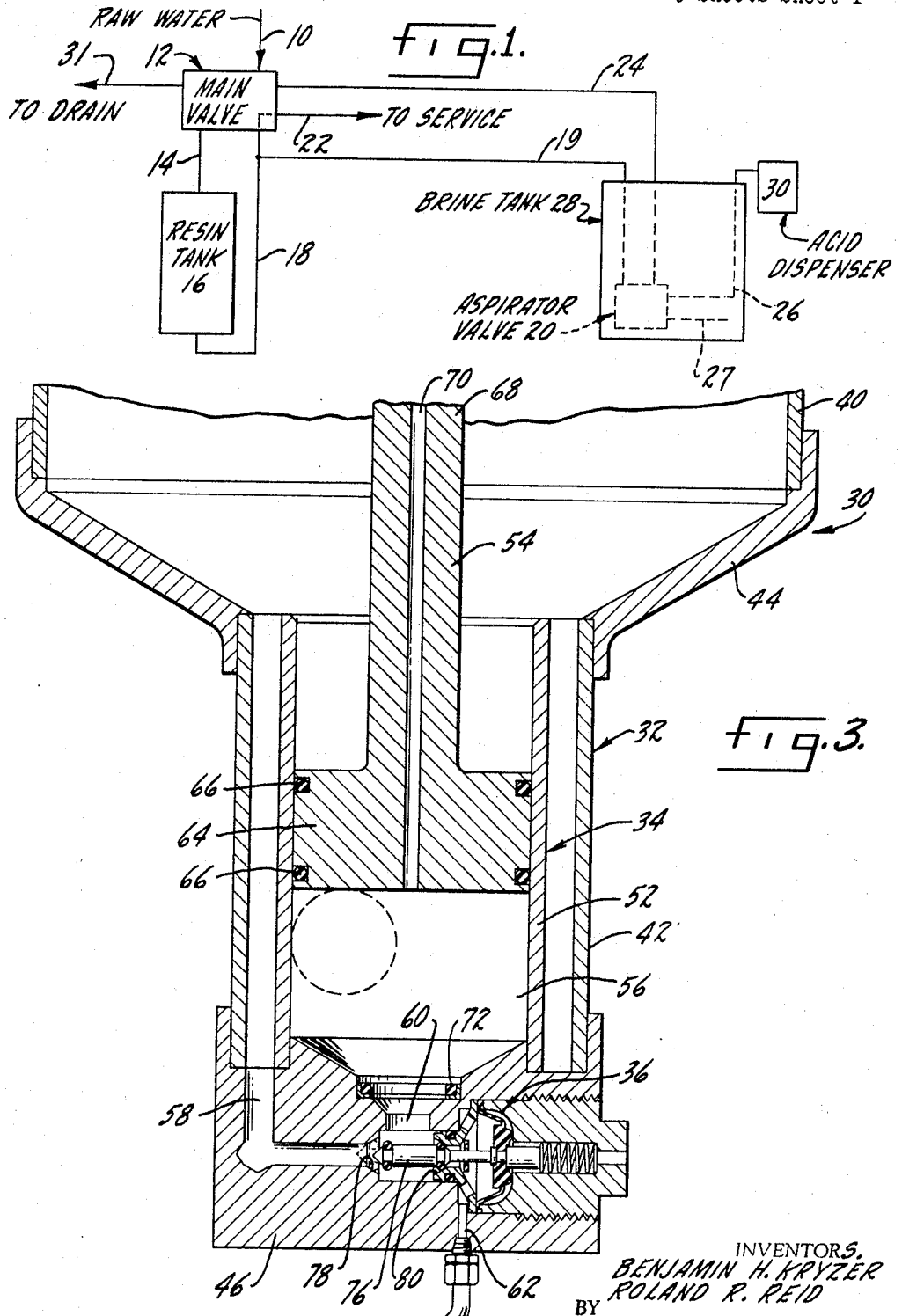
FIGURE 1 is a schematic diagram of a water softening system wherein water is treated with ion exchange resin particles which are regenerated by an acid solution and a brine solution, the acid solution being supplied from an acid dispenser embodying the features of the present invention.

Referring to the drawings, and more particularly to FIGURE 1, there is schematically illustrated a water softening system for treating water with ion exchange resin particles. Suitable ion exchange resin particles are well known in the art and do not constitute a part of the present invention. In this system the ion exchange resin particles, when they become exhausted, are regenerated with an acid solution and a brine solution.

During the service cycle, raw water from a suitable source is passed through a feed line 10 to a main valve indicated generally by reference numeral 12. The main valve 12 directs the raw water through a line 14 to a resin tank 16 which contains a bed of the ion exchange resin particles as is well known in the art. The raw water passes through the bed of ion exchange resin particles and is withdrawn from the tank 16 through a line 18. The treated water, which has been softened by contact with the ion exchange resin particles, passes through the line 18 to the main valve 12 which diverts it to a service line 22. There is, of course, no mixing of the treated water with the raw water in the main valve 12.

After a predetermined quantity of raw water has passed through the resin tank 16, the ion exchange resin particles lose their capacity to effectively soften the raw water and must be regenerated. This is effected by contacting the exhausted resin particles with a mixture of an acid solution and a brine solution. The regeneration cycle is initiated by actuating the main valve 12 so that a portion of the raw water from the line 10 is directed to the service line 22. In this manner, a supply of water is maintained to the service line 22 during the regeneration cycle. The remainder of the raw water is directed by the main valve 12 through a line 24 into an aspirator valve 20. As the raw water passes through the aspirator valve 20 in this direction, i.e., a pressure less than atmospheric pressure, is created therein and in lines 26 and 27 which communicate with the aspirator valve 20. The line 27 communicates with the interior of a brine tank 28 in which the aspirator valve 20 is suitably mounted. The line 27 communicates with the acid dispenser 30 embodying the features of the present invention. By virtue of the partial vacuum or low pressure created in the lines 27 and 26, a brine solution is drawn from the brine tank 28 and a predetermined amount of acid solution is drawn from the acid dispenser 30, respectively. The acid solution and the brine solution enter the aspirator valve 20 and pass through a line 19 to the line 18 and into the tank 16. Suitable valve means (not shown) prevent acid and brine solution from passing directly from the line 18 into the main valve 12. After passing upwardly through the bed of resin particles in the tank 16, and thereby regenerating the resin particles, the acid solution and brine solution are passed to drain through a line 31 after passing through the line 14 and the main valve 12. The main valve 12 prevents the raw water from mixing with the brine solution and acid solution. Likewise, the acid and brine solution cannot enter the service line 22.

When the regeneration of the resin particles in the tank 16 is complete, the regeneration cycle is terminated by actuating the main valve 12 so that the raw water passes through the line 14, the tank 16, the line 18, the main valve 12, and the service line 22, as discussed hereinbefore. During the service cycle some of the treated water passes through the line 19 and the aspirator valve 20 to the line 27 to supply make-up water to the brine tank 28, as is well known in the art. The line 27 has suitable valve means (not shown) to automatically terminate the flow of make-up water to the brine tank 28 after sufficient make-up water has been added. Valve means for this purpose are well known in the art and do not constitute a part of the present invention. The make-up water dissolves solid sodium chloride or the like in the brine tank 28 to form the brine solution utilized in the next regeneration cycle.

Furthermore, treated water under a high pressure (greater than atmospheric pressure) enters the line 26. As will be more fully explained hereinafter, the high pressure of the treated water in the line 26 causes the acid dispenser 30 to meter another predetermined amount of acid solution during the service cycle so that the acid dispenser 30 is ready to discharge this acid solution to the line 26 during the regeneration cycle. The partial vacuum or low pressure in the line 26 during the regeneration cycle actuates the acid dispenser 30 whereupon it dispenses the predetermined amount of acid solution which has been metered during the service cycle.

The main valve 12 does not constitute a part of the present invention and suitable valves for this purpose are well known in the art, e.g. the main valve disclosed in United States Pat. No. 2,999,514, assigned to the assignee of the present application. Another suitable main valve is disclosed in copending application Ser. No. 190,995, filed April 30, 1962, now Pat. No. 3,215,273, and assigned to the assignee of the present application. Similarly, suitable aspirator valves 20 are well known in the art. However, it is preferred in this system to employ an aspirator valve of the type disclosed in copending applications Ser. No. 170,043, filed Jan. 31, 1962, now abandoned, and Ser. No. 191,767, filed May 2, 1962, now Pat. No. 3,185,302, which are assigned to the assignee of the present application. The system may, of course, be operated manually, automatically or semi-automatically by suitable means (not shown) which do not constitute a part of the present invention.

Figure 2:
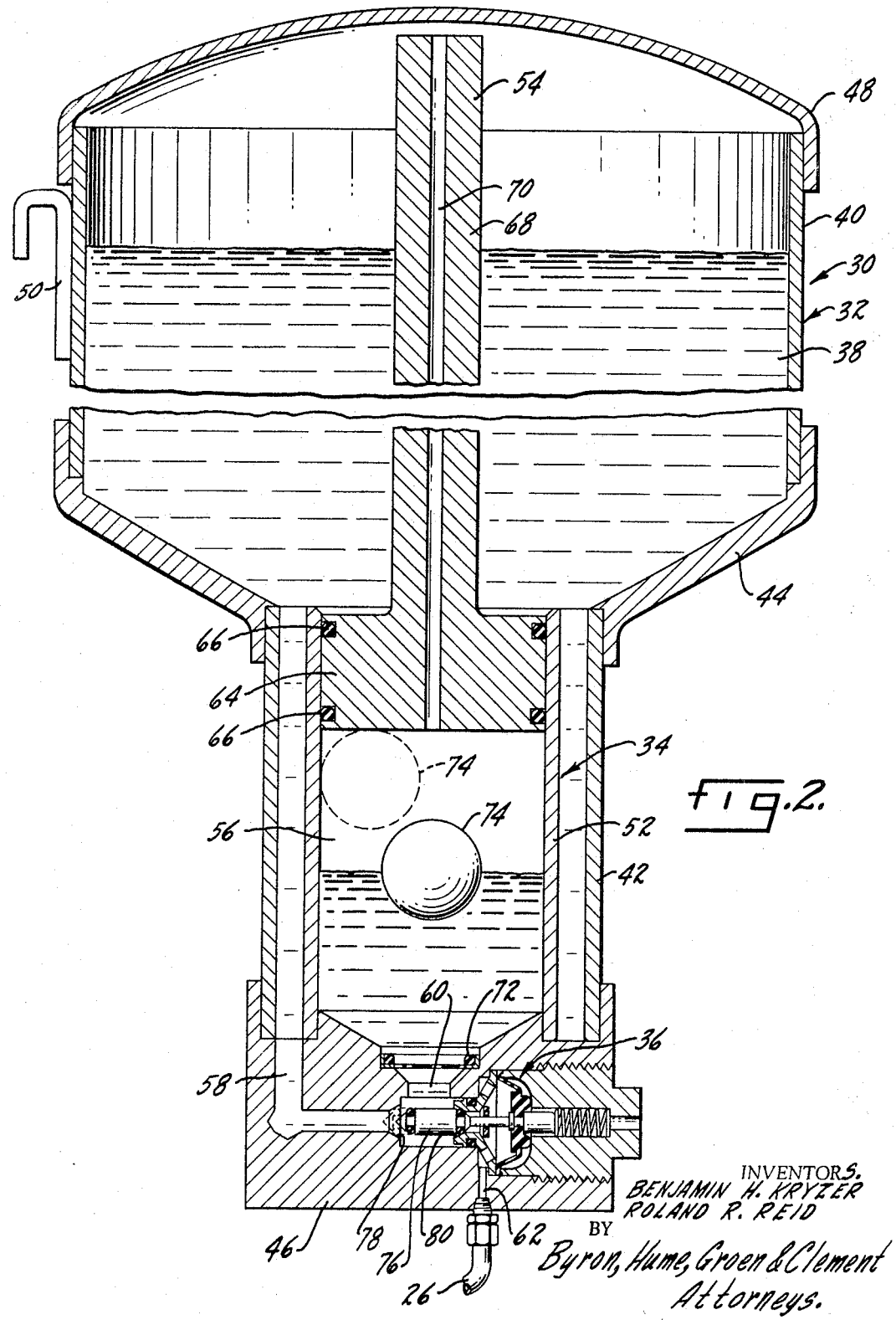
FIGURE 2 is a cross-sectional view of the acid dispenser shown in FIGURE 1 as a metering device in the acid dispenser is being filled with acid solution.

Referring now to FIGURES 2 and 3, the acid dispenser 30 embodying the features of the present invention will be discussed in detail. The acid dispenser 30 comprises an acid container indicated generally by reference numeral 32, a metering device indicated generally by reference numeral 34 and a valve means indicated generally by reference numeral 36. The acid container 32 forms an acid reservoir chamber 38 and contains a relatively large supply of a suitable aqueous acid solution, such as citric acid or the like. To these ends, the acid container 32 comprises a cylindrical body member 40 and a second cylindrical body member 42 connected to one another with an outwardly flaring annular member 44. The members 40, 42 and 44 are made of metal, plastic or other suitable material and are connected by welding or other suitable means. The acid container 40 has a bottom member 46 secured thereto by welding or other suitable means and a lid or top 48 which closes the upper end of the body member 40 to prevent foreign matter from entering the reservoir chamber 38. A fastener means 50 is welded or otherwise suitably secured to the body member 40 to allow the acid dispenser 30 to be hung on the brine tank 28 or placed in any other desired location.

Positioned in the reservoir chamber 38 is the metering device 34 which receives acid solution from the reservoir chamber 38. The metering device 34 isolates a predetermined amount of acid solution from the reservoir chamber 38 and dispenses this predetermined amount of acid solution to the line 26 in a manner more apparent hereinafter. The metering device 34 comprises a tubular body member 52, made of metal, plastic or other suitable material, which is secured by welding or the like to the bottom member 46 of the container 32. Slidingly engaging the tubular body member 52 is a plunger means 54. The tubular body member 52 and the plunger means 54 form a metering chamber 56, which is connected to the reservoir chamber 38 by a passageway 60, the valve means 36, and a passageway 58. Any flow of acid solution from the reservoir chamber 38 to the metering chamber 56 must pass through the passageway 58, the valve means 36 and the passageway 60. Likewise, any flow of acid solution from the metering chamber 56 to the line 26 must pass through the passageway 60, the valve means 36 and a passageway 62 in the bottom member 46 of the container 32.

The plunger means 54, which is made of metal, plastic or other suitable material, has a flange portion 64 which is adapted to slidably engage the interior surface of the tubular body member 52. The outside diameter of the flange 64 is slightly less than the inside diameter of the tubular body member 52. In this manner the plunger means 54 may be moved upwardly and downwardly in the tubular body member 52 to alter the size of the metering chamber 56 and vary the amount of acid solution to be dispensed to the line 26. Acid solution is prevented from passing between the flange portion 64 and the body member 52 by sealing means 66, such as rubber O-rings or the like, mounted on the exterior surface of the flange portion 64 of the plunger means 54. In addition, the plunger means 54 has an upwardly extending vent tube portion 68. A passageway 70 extends through the vent tube portion 68 and the flange portion 64 to connect the reservoir chamber 38 and the metering chamber 56. The passageway 70 vents air displaced by the acid solution entering the metering chamber 56 from the reservoir chamber 38.

The passageway 60 has a port or valve seat means 72. A floatable ball valve 74, made of plastic or other suitable material, is in the metering chamber 56. The floatable ball valve 74 is adapted to seat on the port 72 when the metering chamber 56 is substantially without acid solution for reasons more apparent hereinafter.

The valve means 36 is of the type disclosed in detail in the copending Kryzer et al. application Ser. No. 285,815, filed June 5, 1963, and assigned to the same assignee as the present application, and does not constitute a part of the present invention. The valve means 36 is adapted to allow acid solution to flow from the reservoir chamber 38 through the passageway 58 into the passageway 60 and the metering chamber 56 during the service cycle while preventing acid solution from passing to the line 26. During the regeneration cycle, the valve means 36 permits the acid solution to flow from the metering chamber 56 to the line 26. To these ends the valve means 36 includes, among other things, a pressure-actuated valve member 76 to open and close a port 78 and a port 80. The port 78 allows the passageway 58 to communicate with the passageway 60 while the port 80 allows the passageway 60 to communicate with the passageway 62, which in turn communicates with the line 26.

During the service cycle the valve means 36 is in the position shown in solid lines in FIGURE 2 by virtue of the line 26 being under a high pressure. In this position the valve member 76 closes the port 80 and opens the port 78 whereby acid solution passes by the force of gravity from the reservoir chamber 38 to the metering chamber 56 through the passageway 58, the port 78 and the passageway 60. The ball valve 74 floats on the acid solution entering the metering chamber 56 of the metering device 34. Acid solution continues to flow into the metering chamber 56 until the metering chamber 56 has been filled and acid solution has risen in the passageway 70 to a level equal to the level of the acid solution in the reservoir chamber 38. As shown in dotted lines in FIGURE 2, the floatable ball valve 74 is not intended to close off the passageway 70 as the metering chamber 56 is filled. For this reason the acid solution will rise in the passageway 70 until it has attained a level equal to the level of the acid solution in the reservoir chamber 38. The vent portion 68 of the plunger means 54 extends above the level of the acid solution in the reservoir chamber 38. Once a static state has been reached the acid dispenser 30 is ready for the regeneration cycle.

When the regeneration cycle begins, the line 26 is placed under a low pressure or partial vacuum. This causes the valve means 36 to be actuated, as discussed in detail in the copending Kryzer et al. application referred to hereinbefore, causing the valve member 76 to move to its position shown in dotted lines in FIGURE 2. In this position, the port 78 is closed and the port 80 is opened and acid solution is drawn from the metering chamber 56 through the passageway 60, the valve means 36 and the passageway 62 into the line 26 from which it travels to the resin tank 16. The flow of acid solution from the metering chamber 56 continues until the metering chamber 56 is substantially empty and the floatable ball valve 74 seats upon the valve seat 72. In this manner, the ball valve 74 prevents the introduction of air into the line 26 and the system.

After the regeneration cycle has been completed, the service cycle is initiated again and the cycle of the acid dispenser 30 repeated. Accordingly, during each regeneration cycle the acid dispenser 30 will discharge to the line 26 substantially the same amount of acid solution, which, of course, is determined principally by the size of the metering chamber 56. In this manner, the acid dispenser 30 is adapted to dispense a predetermined amount of acid solution to the line 26 in the water softening system during each regeneration cycle. When the level of the acid solution in the reservoir chamber 38 approaches the level of the top of the metering chamber 56 additional acid solution must be added to the reservoir chamber 38.

If it is desired to vary the amount of acid solution to be dispensed during each regeneration cycle, the plunger means 54 may be moved within the tubular body member 52 to change the size of the metering chamber 56. For example, in FIGURE 3 the plunger means 54 has been moved downwardly in the tubular body member 52 to reduce the size of the metering chamber 56 and thereby reduce the amount of acid solution which is to be dispensed during each regeneration cycle to the line 26 and the resin tank 16.

Referring now to FIGURE 4 there is illustrated a modified acid dispenser 100 embodying the features of the present invention. The acid dispenser 100 comprises an acid container 102, a metering device indicated generally by reference numeral 104 and a valve means indicated generally by reference numeral 106. The acid dispenser 100 performs essentially the same functions as the acid dispenser 30 described hereinbefore. To these ends, the acid container 102 forms an acid reservoir chamber 107 and contains a relatively large supply of a suitable aqueous acid solution, such as citric acid or the like. The container 102 comprises a cylindrical body member 108 having a bottom member 110 and a lid 112 to prevent foreign matter from entering the reservoir chamber 106. The members 108, 110 and 112 are made of metal, plastic or other suitable material and are connected by welding or other suitable means. A fastener means 114 is secured by bolts 116 or other suitable means to the body member 108. In this manner, the acid dispenser 100 may be hung on the brine tank 28 or placed in any other desired location.

The metering device 104 is, in this instance, positioned in the reservoir chamber 107 and comprises a tubular body member 118 having one end suitably attached by welding or the like to the bottom member 110 of the container 102. A lid 120 is attached to the tubular body member 118 by threaded engagement therewith or other suitable means (not shown). Extending into the body member 118 is a plunger means 121 having a vent tube means 122 and a sealing means 124. The sealing means 124 forms with the body member 118 a metering chamber 126 wherein acid solution is isolated for the regeneration cycle. The vent tube means 122 extends through a hole 128 in the lid 120 of the metering device 104. There is a sliding engagement between the vent tube means 122 and the lid 120 to allow the plunger means 121 to be moved upwardly and downwardly to vary the size of the metering chamber 126 in the metering device 104. Acid solution may not pass from the reservoir chamber 107 to the metering chamber 126 between the vent tube means 122 and the lid 120 and past the sealing means 124.

The sealing means 124 of the plunger means 121 is made of plastic, rubber or other suitable flexible material and is a hollow concave member. The peripherial edge 125 of the sealing means 124 is pressed firmly against the interior surface of the body member 118 thereby providing a seal which prevents acid solution from flowing between the body member 118 and the sealing means 124.

The metering chamber 126 communicates with the reservoir chamber 107 through a passageway 130, the valve means 106 and a passageway 132 having an annular opening 134 to the reservoir chamber 126. A floatable closure means indicated generally by reference numeral 136 opens and closes the opening 134. The floatable closure means 136 does not constitute a part of the present invention and is of the type described in detail in the copending Tischler et al. application, Ser. No. 115,656, filed June 8, 1961, now Pat. No. 3,126,907 and assigned to the assignee of the present application. The closure means 136 comprises a floatable valve member 137 which rises upwardly on a stem member 138 for a short distance as acid solution enters the metering chamber 126. The stem member 138 prevents the valve member 137 from rising past a predetermined height and the valve member 137 will become submerged in the acid solution entering the metering chamber 126, as shown in FIGURE 4. However, as the acid solution is drawn out of the metering chamber 126 during the regeneration cycle, the valve member 137, and its sealing means 139, will seat and close off the annular opening 134 of the passageway 132, as shown in dotted lines in FIGURE 4. As will be more apparent hereinafter other valve means, such as a floatable ball valve, may be used in place of the closure means 134.

The flow of acid solution to and from the metering chamber 126 of the metering device 104 is controlled by the pressure in the line 26 and the valve means 106. The valve 106 is of the type disclosed in the copending Kryzer et al. applicaiton Ser. No. 285,815, filed June 5, 1963, and assigned to the same assignee of the present invention. The valve means 106 is adapted to allow acid solution to flow from the reservoir chamber 107 through the passageway 130 into the passageway 132 and the metering chamber 126 during the service cycle while preventing acid solution from passing to the line 26. During the regeneration cycle, the valve means 106 permits the acid solution to flow from the metering chamber 126 to the line 26. To these ends the valve means 106 includes, among other things, a pressure-actuated valve member 140 to open and close a port 142 and a port 144. The port 142 allows the passageway 130 to communicate with the passageway 132 while the port 144 allows the passageway 132 to communicate with a passageway 146, which in turn communicates with the line 26.

During the service cycle, the valve member 140 of the valve means 106 is actuated by the pressure of the treated water in the line 26 so that it closes the port 144 and opens the port 142, as shown in solid lines in FIGURE 4. This allows acid solution in the reservoir chamber 107 to flow, by gravity, through the passageway 130, the port 142, the passageway 132 and the annular opening 134 into the metering chamber 126. The valve member 137 rises with the level of the acid solution in the metering chamber 126 until it is stopped by the stem member 138, as seen in FIGURE 4. The flow of acid solution from the reservoir chamber 107 to the metering chamber 126 continues until the metering chamber 126 is filled and acid solution has risen in the vent tube 122 to the level of the acid solution in the reservoir chamber 107. Air displaced by the acid solution entering the metering chamber 126 is vented through the vent tube means 122, which extends above the level of the acid solution in the reservoir chamber 107. The acid dispenser 100 is ready for the regeneration cycle.

When the regeneration cycle occurs, the line 26 is placed under a partial vacuum or low pressure as described hereinbefore. This actuates the valve means 106 causing the valve member 140 thereof to be moved to its position shown in dotted lines in FIGURE 4. In this position, the port 142 is closed and the port 144 is opened and acid solution is drawn from the metering chamber 56 through the passageway 132, the valve means 106 and the passageway 146 into the line 26 from which it travels to the resin tank 16. The flow of acid solution from the metering chamber 26 continues until the level of the acid solution is such that the floatable valve member 137 seats and closes the annular opening 134, as shown in FIGURE 4. In this manner, the valve means 136 prevents the introduction of air into the line 26 or the system.

After the regeneration cycle has been completed, the service cycle is initiated again and the cycle of the acid dispenser 100 repeated. Accordingly, during each regeneration cycle the acid dispenser 100 will discharge to the line 26 substantially the same amount of acid solution, which, of course, is determined principally by the size of the metering chamber 126. In this manner, the acid dispenser 100 is adapted to dispense a predetermined amount of acid solution to the line 26 in the water softening system during each regeneration cycle. When the level of the acid solution in the reservoir chamber 107 approaches the level of the top of the metering chamber 126, additional acid solution must be added to the reservoir chamber 107.

If it is desired to vary the amount of acid solution to be dispensed during each regeneration cycle, the plunger means 121 may be moved within the tubular body member 118 to increase or decrease the size of the metering chamber 126. In this manner, a different amount of acid solution will be dispensed to the line 26 during each regeneration cycle.

It will be understood that by altering the piping from the aspirator valve 20, the resin particles in the tank 16 may be contacted sequentially with acid solution and brine solution.

Though the dispensers 30 and 100 have been discussed in detail with respect to dispensing acid solutions, these dispensers may be used to dispense any liquid by constructing its parts of suitable material.

While the embodiments described herein are at present considered to be preferred, it will be understood that various modifications and improvements may be made therein and it is intended to cover in the appended claims all such modifications and improvements as fall within the true spirit and scope of the invention.

What is claimed is:

1. A liquid dispenser comprising a totally enclosed container for a liquid, a removable top cover on said container permitting access thereinto, means forming a separate enclosed metering chamber within said container, said chamber communicating with the remaining portion of said container through a passageway connected to valve means for controlling liquid flow into and out of said chamber, a slideable plunger engaging an interior surface of said chamber so that movement thereof varies the size of said chamber and thereby determines the volume of liquid dispensed therefrom, said plunger comprising a flexible concave member having a peripheral edge pressing against the interior of said chamber, said plunger having an upwardly extending vent tube attached thereto so as to be movable therewith, said tube terminating adjacent said top cover on the inside of said container for causing air flow between the inside of said container and the inside of said chamber, and float valve means within said chamber preventing flow from said chamber after said volume of liquid has been dispensed therefrom, said float valve means comprising a float slidably connected to a stem protruding from said passageway, said float constructed to close said passageway when the metering chamber is empty.

2. In a water softening system wherein water to be treated is contacted with ion exchange resin particles during a service cycle and the ion exchange resin particles are regenerated with regenerant solution during a regeneration cycle, a regenerant solution dispenser connected to a line in said system for passing regenerant solution to said resin particles during said regeneration cycle, said dispenser comprising a closed container for said regenerant solution, said container having a removable top cover permitting access thereinto, means forming a separate enclosed metering chamber within said container, said chamber communicating with the remaining portion of said container through a passageway connected to valve means connected to said line, a slideable plunger engaging an interior surface of said chamber so that movement thereof varies the size of said chamber and thereby determines the volume of regenerant solution dispensed therefrom, said plunger comprising a flexible concave member having a peripheral edge pressing against the interior of said chamber, said plunger having an upwardly extending vent tube attached thereto and movable therewith, said tube terminating adjacent said top cover on the inside of said container for causing air flow between the inside of said container and the inside of said chamber, and a float valve within said chamber preventing flow of air and regenerant solution from said chamber after said volume of regenerant solution has been dispensed therefrom, said float valve means comprising a float slidably connected to a stem protruding from said passageway, said float constructed to close said passageway when the metering chamber is empty.

References Cited

UNITED STATES PATENTS

| | | | |
|---|---|---|---|
| 1,048,757 | 12/1912 | Strong et al. | 210—101 X |
| 1,611,422 | 12/1926 | Duden | 210—190 X |
| 2,304,661 | 12/1942 | Shoemaker | 210—191 X |
| 2,557,386 | 6/1951 | Lonier | 222—440 X |
| 2,565,045 | 8/1951 | Ray | 222—444 X |
| 2,609,974 | 9/1952 | Brous | 222—442 |
| 3,071,150 | 1/1963 | Whitlock | 137—391 |
| 3,176,876 | 4/1965 | Fischer et al. | 222—440 X |
| 3,194,434 | 7/1965 | Evanson | 222—444 X |
| 3,216,931 | 11/1965 | Dennis et al. | 210—191 X |

FOREIGN PATENTS 325,240  2/1930  Great Britain.

REUBEN FRIEDMAN, *Primary Examiner.*

C. M. DITLOW, *Assistant Examiner.*